(12) United States Patent
Watkins et al.

(10) Patent No.: US 6,300,770 B1
(45) Date of Patent: Oct. 9, 2001

(54) HOST REGISTER INTERFACE TESTING ON BIT STREAM BASED SYSTEMS

(75) Inventors: Daniel Watkins, Saratoga; Vikas Bhirud, Sunnyvale, both of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/467,193

(22) Filed: Dec. 20, 1999

(51) Int. Cl.[7] .................................................. G01R 31/28
(52) U.S. Cl. ........................................ 324/537; 324/763
(58) Field of Search ..................................... 324/527, 537, 324/538, 763, 764; 702/57, 58

(56) References Cited

U.S. PATENT DOCUMENTS 4,637,020 * 1/1987 Schinabeck ........................... 714/736
5,589,777 * 12/1996 Davis et al. ........................... 324/537

* cited by examiner

Primary Examiner—Safet Metjahic
Assistant Examiner—T. R. Sundaram

(57) ABSTRACT

A host register interface testing system and method are disclosed. The system includes a host register unit including information that is indicative of a set of host registers corresponding to a programmable device under test. The system further includes a rule set unit including information that is indicative of constraints on values that the set of host registers may assume and a test setup generator configured to access the host register unit and the rule set unit and to generate a set of test setups based on the contents of the host register unit and the rule set unit where each test setup corresponds to a valid state of the set of host registers. In one embodiment, the test setup generator is suitable for applying a test setup from the set of test setups to the device under test. In one embodiment, the system may further include a verifier configured to receive the output of the device under test and, based thereon, for determining the functionality of the device under test. The verifier is preferably adapted to record the functionality determination as well as the test setup generator records in a test results log.

16 Claims, 4 Drawing Sheets

HOST REGISTER INTERFACE TESTING ON BIT STREAM BASED SYSTEMS

BACKGROUND OF THE INVENTION

1. Field of the Invention

The present invention is related to the field of bit stream based systems and more particularly to an automated system for host register interface testing.

2. Description of the Relevant Art

Comprehensive verification of host register interfaces provided by programmable chips is a difficult task that is consuming an increasing amount of resources with the advent of increasingly complex system-on-a-chip style application specific integrated circuits (ASIC's). These ASICs may include a large number of programmable operation modes available through a set of host registers. Traditionally, a set of separate tests has been crafted to verify each feature or operating mode of a device independently. Typically, a test template source code is used as a starting point. The various tests are then generated by modifying appropriate parameters in the template source code. Unfortunately, this traditional approach requires a time consuming recompilation of source code each time a new test is to be run. This results in a large number of test programs that have to be executed sequentially to achieve adequate verification coverage of the host register interface. In addition, the process must be repeated for each new revision of a device to ensure compatibility with previous versions. Because this traditional approach to verification is a time consuming process, it would be desirable to implement a system that generated the required test cases automatically.

SUMMARY OF THE INVENTION

The identified problem is addressed in large part by a programmable interface testing system and a related method and computer readable medium. The system includes a host register unit including information that is indicative of a set of host registers corresponding to a programmable device under test. The system further includes a rule set unit including information that is indicative of constraints on values that the set of host registers may assume and a test setup generator configured to access the host register unit and the rule set unit and to generate a set of test setups based on the contents of the host register unit and the rule set unit where each test setup corresponds to a valid state of the set of host registers. In one embodiment, the test setup generator is suitable for applying a test setup from the set of test setups to the device under test. In one embodiment, the system may further include a verifier configured to receive the output of the device under test and, based thereon, for determining the functionality of the device under test. The verifier is preferably adapted to record the functionality determination as well as the test setup generator in a test results log.

BRIEF DESCRIPTION OF THE DRAWINGS

Other objects and advantages of the invention will become apparent upon reading the following detailed description and upon reference to the accompanying drawings in which.

Figure 1:
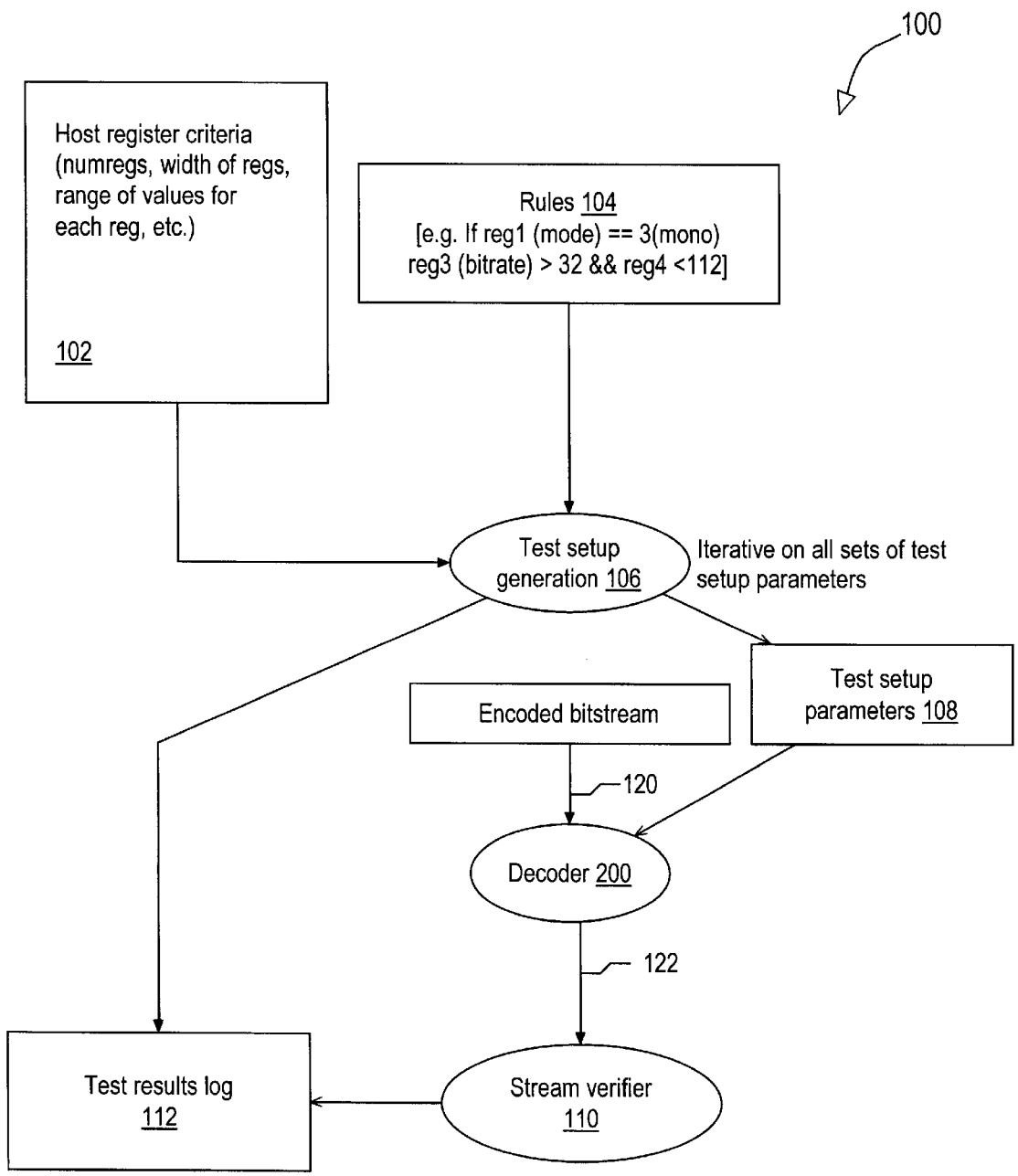
FIG. 1 is a block diagram of selected elements of a system for testing a programmable host register according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

The present invention contemplates a system and methodology for automating the verification process of an integrated circuit that includes multiple registers for setting various modes or settings of the device. The invention may be suitably implemented as a set of instructions executable by a microprocessor based computer or data processing system. Thus, one embodiment of the invention may comprise a computer readable medium such as the system memory of a data processing system, a floppy diskette, a hard disk, a CD ROM, a magnetic tape, or other suitable medium. The computer readable medium is configured with instructions suitable for implementing the methods of testing a set of host interface registers in a programmable device as described below. Although the embodiments described herein emphasize an application for use in conjunction with a representative audio decoder, the invention is applicable to virtually any device that includes a set of programmable host registers.

Figure 2:
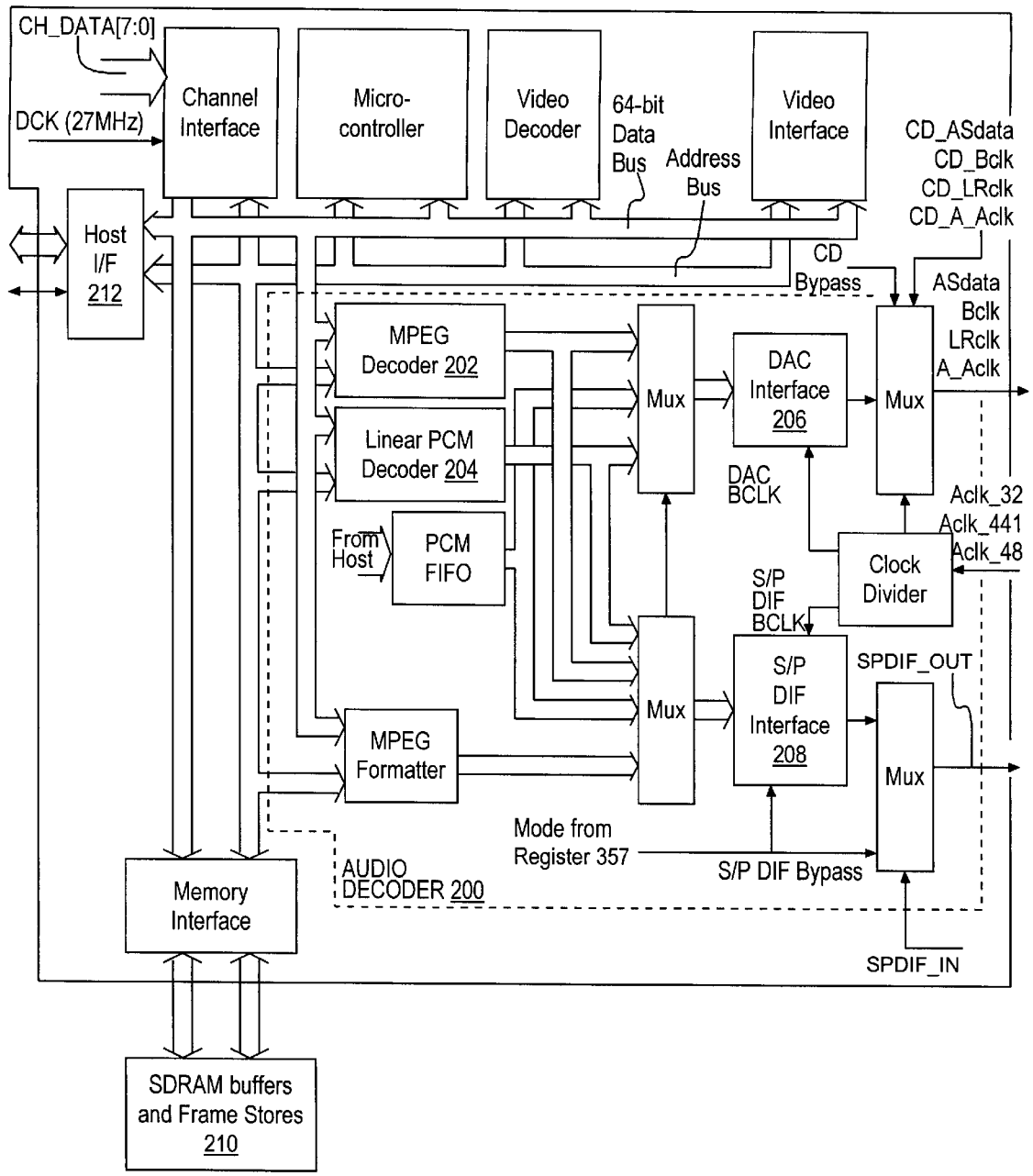
FIG. 2 is a block diagram of selected elements of an audio decoder suitable for use with the programmable host register testing system of FIG. 1.

Turning now to the drawings, FIG. 1 illustrates selected components of a system 100 for systematically verifying all of the modes and features of a programmable device (an audio decoder in this case). A block diagram of a representative device under test in the form of an audio decoder 200 is depicted in FIG. 2. The depicted embodiment of audio decoder 200 is suitable for processing two different audio input bit streams via an MPEG decoder 202 and a linear PCM decoder 204. Audio decoder 200 further includes two output interfaces, a serial DAC interface 206, and an IEC958 Sony/Philips Digital Interface (S/P DIF) 208. When the host processor (not depicted) starts one of the audio decoders, audio frames/packets are retrieved from audio channel buffers in SDRAM 210, decoded, and formatted. The decoders parse most of the parameters from the bit stream and store them in a set of host interface registers (not depicted) in the host interface 212. The host processor reads these registers and writes decoder commands to other registers to modify the audio. In one embodiment, audio decoder 200 is integrated as part of an audio/video decoder such as the L64105 MPEG-2 Audio/Video Decoder and the L64021 DVD Audio/Video Decoder, from LSI Logic Corporation, 1551 McCarthy Blvd, Milpitas Calif., 95035.

Returning now to FIG. 1, system 100 includes a host register criteria block 102 and a rules block 104. The host register criteria block 102 contains information about or indicative of a set of host registers in the host interface 212 of the device under test. Typically, the device under test includes multiple programmable interface registers that define the operating mode of the device. In an embodiment in which the device under test comprises, for example, the audio decoder 200 of FIG. 2, host register criteria block 102 may include information concerning host interface registers in audio decoder 200 that affect, as examples, decoder play mode, formatter play mode, decoder mode selection, audio dual-mono mode, PCM scaling, dynamic ranging, and a variety of other audio features that audio decoder 200 may support. (The reader interested in additional information concerning the set of host registers in an exemplary audio decoder is referred to the L64104 MPEG-2 Audio/Video Decoder Technical Manual (Doc. No. DB14-000041-00) from LSI Logic Corporation, which is incorporated by reference herein). In the depicted embodiment of system 100, the host register criteria block 102 includes information such as the number of host interface registers, the width of each register, and the range of values each register may assume. The host register criteria block 102 may be specified as a set of read/write criteria for each bit in all of the registers within the host register interface. The rules block 104 contains a set of constraints on the values that each of the registers may assume. If, for example, the device under test is an audio decoder that receives a bit stream with a particular bit rate, the detected bit rate may impose a constraint on the decoder dual-mono mode. This constraint and other analogous constraints, restrictions, requirements on the features are represented in the rules block 104.

System 100 includes a test setup generation unit 106 that uses the information in host register criteria block 102 and rules block 104 and to generate a set of test setups 108 based upon the information in blocks 102 and 104. Each test setup 108 defines a given set of register parameters for the device under test to use to process a bit stream. In one embodiment, test setup generation unit 106 is suitable for generating every useful (i.e., permitted) test setup of the interface registers of the device under test by iteratively processing the host registers defined by host register criteria block 102 to produce all possible values of the host registers. Using a simple example for illustration purposes, consider a device under test that includes two host interface registers, a 4-bit register, and a 3-bit register. The 3-bit register is capable of assuming one of eight values and the 4-bit register is capable of assuming one of 16 values. Together, the two registers can combine to form a set of 128 permutations. Rules block 104 may include restrictions on the values that the two registers may assume. As an example, imagine that the high order bit of the 4-bit register and the high order bit of the 3-bit register cannot both be asserted simultaneously. Test setup generation unit 106 would use the information from rules block 104 to eliminate invalid test setups. In the case described, the elimination of all permutations in which the high order bit of both registers is 1 would eliminate ¼ of the total possible permutations from consideration.

In one embodiment, the test setup generation unit 106 generates a set of test setups 108 that preferably includes all allowed permutations of host interface 212 register settings suitable for use with the device under test. The set of test setups 108 is then applied to a device under test, such as the audio decoder 200 depicted in FIG. 1. In this embodiment, the audio decoder 200 is configured to receive an encoded bit stream represented in FIG. 1 by reference numeral 120. Bit stream 120 is decoded by decoder 200, based upon a given test setup from the set of test setups 108, to produce a decoded bit stream 122. In one embodiment, system 100 iteratively applies each test setup in the set of test setups 108 to a given bit stream 120. The functionality of the device under test is verified with respect to each test setup by verifying the device's output. In the depicted embodiment, the functionality of the audio decoder under each test setup is verified with a stream verifier 110 configured to receive the decoded output of audio decoder 200 and to verify that the device under test supports all of its features with respect to bit stream 120. The preferred embodiment of system 100 includes capabilities for recording the results of the verification process. In the depicted embodiment, the output of stream verifier 110 is stored in a test result log 112 for subsequent review and analysis by the system user. The system may include an interface (not shown) for interacting with the test results log 112 and displaying the data in a graphical format to facilitate the analysis of the recorded data. In addition, the depicted embodiment indicates test setup generation unit reporting its output to test results log 112. In this embodiment, each test setup generated by test setup generation 106 is stored in test result log 112 provide a record of the test setups that have been verified.

Figure 3:
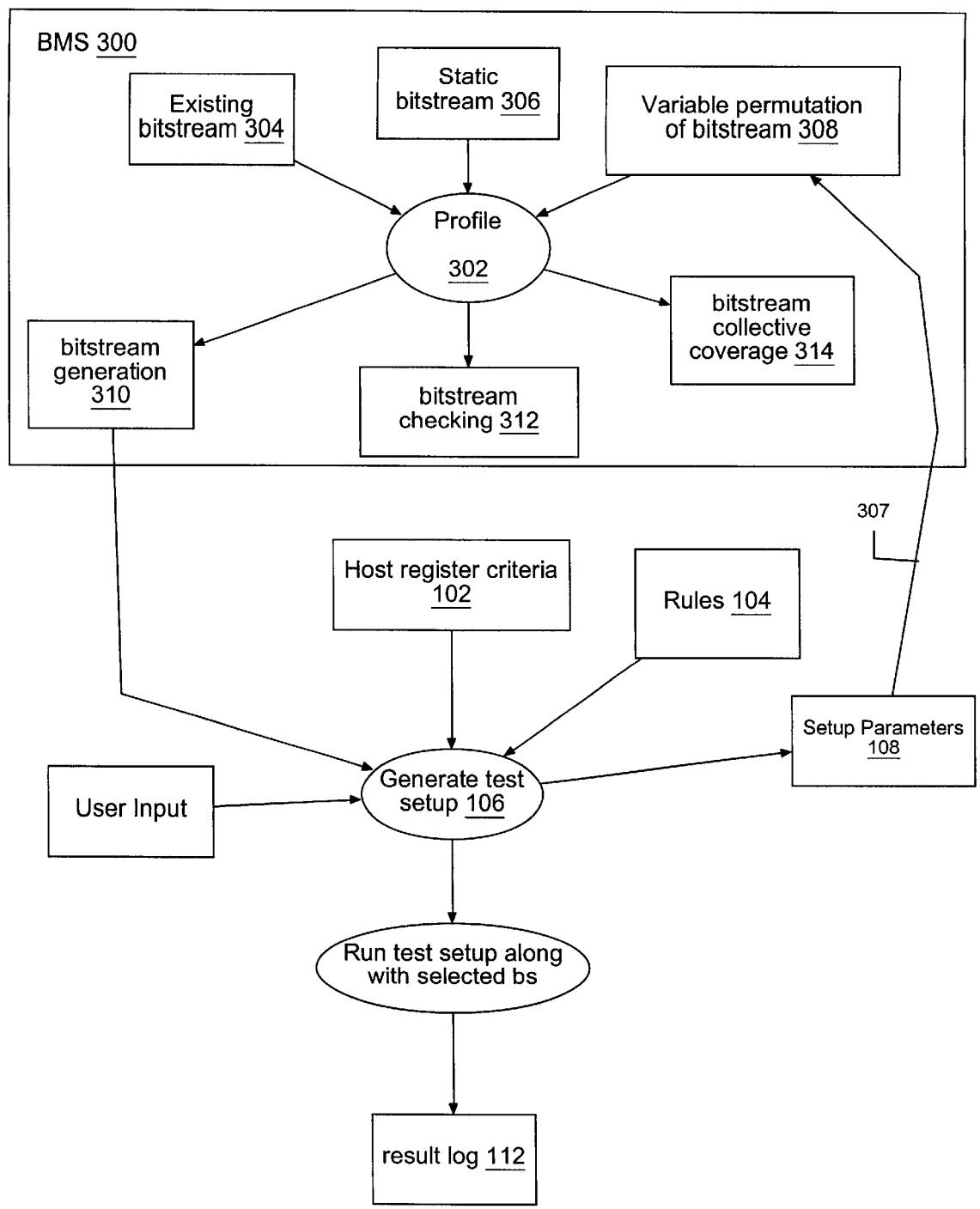
FIG. 3 is a block diagram of selected elements of the programmable host register according to FIG. 1 coupled with a bit stream manager system.
Figure 4:
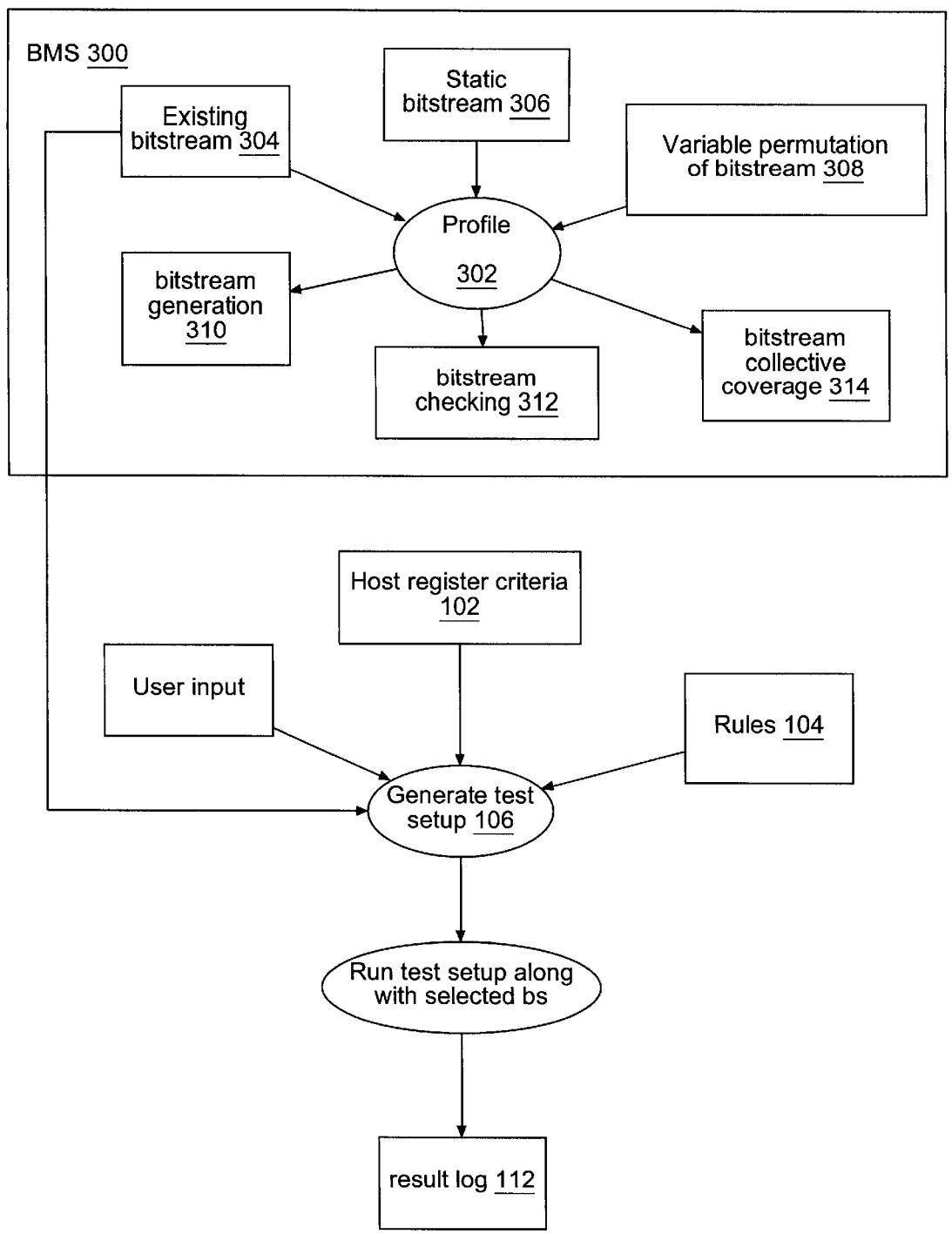
FIG. 4 is an alternative arrangement of the system of FIG. 1 and the bit stream manager of FIG. 3.

Turning now to FIGS. 3 and 4, block diagrams emphasizing the use of system 100 in conjunction with a bit stream management system (BMS) 300 are presented. BMS 300 is suitable for managing bit streams such as audio/video bit streams. System 100 can utilize BMS 300 when used with test platforms requiring an input bit stream. In a typical audio/video bit stream, a very small percentage of the bit stream comprises the bit stream's header and syntax, while the great bulk of the bit stream comprises audio/video data. The bit stream may be represented with a "profile" that indicates significant information about the bit stream such as the length of the bit stream, the size of the bit stream's header, the syntax of the bit stream, and so forth. In this manner, a profile of a given bit stream provides a synopsis of the bit stream's format and content. Referring to FIG. 3, the existing bit stream box 304, as its name suggests, represents a previously defined bit stream that has been crafted from an encoder or other suitable source. Although a user may not know what the existing bit stream is comprised of, the existing bit stream may be profiled with BMS profiler 302. Static bit stream box 306, in conjunction with BMS profiler 302, typically represents a manually generated profile from which a bit stream may be generated with the bit stream generation box 310. The profile may be generated using a suitable profile template. The variable permutation bit stream box 308 represents a facility through which the user can define which fields in the syntax, for example, require multiple permutations to improve verification coverage. Variable permutation block 308 will automatically generate the requested permutations in the syntax based on the user's input and build a corresponding set of profiles. Bitstream checking box 312 is used to ensure that the syntax of the profile is compliant with the appropriate standard. If the standard is MPEG2 video, for example, checking box 312 verifies that the profiled follows all of MPEG2 syntax constructs (e.g., block, macroblock, slice, GOP, etc.) in the proper sequence in the bitstream. Similarly for other standards including, as examples, AC3 audio, MPEG audio, or DTS, checking box 312 verifies the syntax of the profile (or of the subsequently formed bit stream) against the appropriate standard. The bit stream collective coverage box 314 is suitable for determining what syntax is covered by an existing bit stream. In addition, collective coverage block 314 is suitable for generating a collective coverage report that indicates the syntax covered by a set of bit streams that may include a large number of bit streams. Additional information regarding an exemplary embodiment of BMS 300 is contained in U.S. Pat. No. 5,983,022 entitled System and Method for Using Profiles to Manage Data Streams for Device Verification, which shares a common assignee with the present invention and is incorporated by reference herein.

In presently preferred embodiments, system 100 can be used in conjunction with BMS 300 to achieve comprehensive test verification in either of two methods. A first approach is to generate the requirements for the bit stream based on the test setup produced by test setup generator 106 and then query BMS 300 for a bit stream with the required specifications. This approach is emphasized in FIG. 3, in which bit stream parameters generated by test setup generator 106 and indicated by reference numeral 107 are received by the variable permutation block 308 of BMS 300. Based on the bit stream specifications indicated by bit stream parameters 107, the variable permutation block 308 generates all suitable permutations of bit stream profiles and the generates the appropriate bit streams with bit stream generation unit 310. If the suitable bit stream profiles are available in a pool of existing bit stream profiles in BMS 300, the bit streams may be generated from the existing profiles instead. In a second approach, emphasized in FIG. 4, a set of existing bit streams is retrieved from a bit stream pool in BMS 300 and provided directly to the device under test. For each bit stream received, system 100 then generates all valid test setups based on the bit stream profile information provided by BMS 300 for each bit stream. Both of these embodiments take advantage of the automation in bit stream generation and management provided by BMS 300 together with the automated test setup generation provided by system 100 as disclosed herein to improve the efficiency of the verification process.

It will therefore be appreciated by those skilled in the field having the benefit of this disclosure that the present invention contemplates a system and method verify the host register interface of a programmable device. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A system suitable for testing a host interface of a device under test, comprising:
   a host register block comprising information indicative of a set of host registers in a host interface unit of the device under test, the host register information including the number of host registers and the number of bits in each host register;
   a rule set block comprising information indicative of constraints on values that the set of host registers may assume; and
   a test setup generator configured to access the host register block and the rule set block and based thereon, to generate a set of test setups, wherein the set of test setups includes each valid state that the set of host registers may assume.

2. The system of claim 1, wherein the test setup generator is configured to apply each test setup from the set of test setups to the host interface of the device under test.

3. The system of claim 1, wherein the set of host registers define the operating mode of the device under test.

4. The system of claim 2, wherein the device under test is an audio decoder and the set of host registers define the decoder play mode, formatter play mode, decoder mode selection, audio dual-mono mode, PCM scaling, and dynamic ranging of the audio decoder.

5. The system of claim 1, wherein the test setup generator records the set of test setups in the result log.

6. The system of claim 1, further comprising a bit stream manager (BMS) configured to provide an audio/video bit stream to the device under test.

7. The system of claim 6, wherein the BMS is configured to generate a set of bit streams responsive to a set of test parameters provided by a testing system.

8. The system of claim 6, wherein the test setup generator generates a set of test setups corresponding to each bit stream.

9. A method of testing an audio decoder including a host interface unit comprising a set of host interface registers, the method comprising:
   receiving host interface register information from a host register block and rule set information from a rule set block, wherein the host register information includes the number of host registers in the host interface unit and the number of bits in each host register;
   generating a set of test setups based on the host interface register information and the rule set information wherein each of the test setups is indicative of a state of a set of host interface registers defining an operating mode of the decoder, and wherein the set of test setups comprises the set of valid operating modes of the decoder; and
   using the set of test setups to verify the functionality of the audio decoder under each of the valid operating modes.

10. The method of claim 9, further comprising generating an audio bit stream wherein verifying the functionality of the programmable device comprises processing the bit stream with the audio decoder while the set of host registers is in each of the valid operating modes.

11. The method of claim 12 wherein the generating of the set of bit streams comprises generating a set of all valid bit streams corresponding to a state of the set of host registers.

12. A computer readable medium configured with a set of instructions for testing an audio decoder including a host interface unit comprising set of host interface registers, the set of instructions comprising:
   computer code means for receiving host interface register information from a host register block and rule set information from a rule set block, wherein the host register information includes the number of host registers in the host interface unit and the number of bits in each host register;
   computer code means for generating a set of test setups based on the host interface register information and the rule set information wherein each of the test setups is indicative of a state of a set of host interface registers defining an operating mode of the decoder, and wherein the set of test setups comprise the set of valid operating modes of the decoder; and
   computer code means for verifying the functionality of the programmable device under each of the valid operating modes of the decoder.

13. The computer readable medium of claim 12, further comprising computer code means for generating an audio bit stream wherein the code means for verifying the functionality of the programmable device comprises code means for processing a bit stream with the programmable device while the decoder is in one of the valid operating modes.

14. The computer readable medium of claim 13 further comprising computer code means for generating a set of bit streams with a bit stream manager (BMS) and forwarding the generated set of bit stream to the audio decoder for processing.

15. The computer readable medium of claim 14 wherein the code means for generating of the set of bit streams comprises code means for generating a set of all valid bit streams corresponding to a state of the set of host registers.

16. The computer readable medium of claim 14 wherein the generating of the test setups comprises receiving a set of bit streams from the BMS and generating a set of all valid test setups for each received bit stream.

* * * * *